US008989145B2

(12) United States Patent  
Das et al.

(10) Patent No.: US 8,989,145 B2
(45) Date of Patent: Mar. 24, 2015

(54) METHODS AND SYSTEMS FOR A GENERIC MULTI-RADIO ACCESS TECHNOLOGY

(71) Applicant: ST-Ericsson SA, Plan-les-Ouates (CH)

(72) Inventors: Sajal Kumar Das, Bangalore (IN); Pankaj Jaiswal, Bangalore (IN)

(73) Assignee: St-Ericsson SA, Plan-les-Ouates (CH)

( * ) Notice: Subject to any disclaimer, the term of this patent is extended or adjusted under 35 U.S.C. 154(b) by 153 days.

(21) Appl. No.: 13/750,209

(22) Filed: Jan. 25, 2013

(65) Prior Publication Data

US 2014/0213261 A1 Jul. 31, 2014

(51) Int. Cl.
*H04W 4/00* (2009.01)
*H04W 36/00* (2009.01)

(52) U.S. Cl.
CPC .................................. *H04W 36/0077* (2013.01)
USPC ........... 370/331; 370/330; 455/437; 455/438; 455/443; 455/436

(58) Field of Classification Search
CPC ...................... H04W 36/0077; H04W 36/0061
USPC ........... 455/437, 438, 443, 436; 370/331, 330
See application file for complete search history.

(56) References Cited

U.S. PATENT DOCUMENTS

2004/0132457 A1* 7/2004 Sanders et al. ................. 455/450
2013/0225169 A1* 8/2013 Farnsworth et al. ........... 455/436

OTHER PUBLICATIONS

3GPP TS 25.133 V11.1.0 (Jun. 2012) Technical Specification; "3rd Generation Partnership Project; Technical Specification Group Radio Access Network; requirements for support of radio resource management (FDD)"; (Release 11); Jun. 2012; pp. 1-273; Valbonne, France.
3GPP TS 45.008 V11.2.0 (Aug. 2012) Technical Specification; "3rd Generation Partnership Project; Technical Specification Group GSM/EDGE Radio Access Network; Radio subsystem link control"; (Release 11); Aug. 2012; pp. 1-148; Valbonne, France.
3GPP TS 36.133 V8.19.0 (Sep. 2012) Technical Specification; "3rd Generation Partnership Project; Technical Specification Group Radio Access Network; Evolved Universal Terrestrial Radio Access (E-ULTRA); requirements for support of radio resource management"; (Release 8); Sep. 2012; pp. 1-338; Valbonne, France.

(Continued)

*Primary Examiner* — Barry Taylor
(74) *Attorney, Agent, or Firm* — Patent Portfolio Builders PLLC

(57) ABSTRACT

Systems and method provide for cell reconfirmation methods for a multi-Radio Access Technology (RAT) capable User Equipment (UE). A method for performing a cell reconfirmation method by a multi-Radio Access Technology (RAT) capable User Equipment (UE), the method includes: performing, by the UE, cell reconfirmation using information derived from a Normal Burst (NB) of a transmitted Global System for Mobile communication (GSM) radio signal, wherein the cell reconfirmation verifies an identity of a GSM cell associated with the transmitted GSM radio signal. The method can further include: operating the multi-RAT capable UE in a serving cell of a first RAT; and selecting the cell reconfirmation method to reconfirm a Global System for Mobile (GSM) communication neighbor cell located in a second RAT which is a GSM RAT, wherein a first cell reconfirmation method uses a received Normal Burst (NB) and a second cell reconfirmation method uses a received Synchronization Burst (SB).

22 Claims, 11 Drawing Sheets

(56) References Cited

OTHER PUBLICATIONS

3GPP TS 25.304 V11.0.0 (Sep. 2012) Technical Specification; "3rd Generation Partnership Project; Technical Specification Group Radio Access Network; User Equipment (UE) procedures in idle mode and procedures for cell reselection in connected mode"; (Release 11); Sep. 2012; pp. 1-52; Valbonne, France.

3GPP TS 25.133 V3.22.0 (Sep. 2005) Technical Specification; "3rd Generation Partnership Project; Technical Specification Group Radio Access Network; Requirements for support of radio resource management (FDD)"; (Release 1999); Sep. 2005; pp. 1-82; Valbonne, France.

3GPP TS 45.010 V11.1.0 (Nov. 2012) Technical Specification; "3rd Generation Partnership Project; Technical Specification Group GSM/EDGE Radio Access Network; Radio subsystem synchronization"; (Release 11); Nov. 2012; pp. 1-32; Valbonne, France.

3GPP TS 45.002 V11.1.0 (Nov. 2012) Technical Specification; "3rd Generation Partnership Project; Technical Specification Group GSM/EDGE Radio Access Network; Multiplexing and multiple access on the radio path"; (Release 11); Nov. 2012; pp. 1113; Valbonne, France.

* cited by examiner

| TRAINING SEQUENCE CODE (TSC) 64 | TRAINING SEQUENCE BITS (BN61, BN62..BN86) 66 |
|---|---|
| 0 | (0,0,1,0,0,1,0,1,1,1,0,0,0,0,1,0,0,0,1,0,0,1,0,1,1,1) |
| 1 | (0,0,1,0,1,1,0,1,1,1,0,1,1,1,1,0,0,0,1,0,1,1,0,1,1,1) |
| 2 | (0,1,0,0,0,0,1,1,1,0,1,1,1,0,1,0,0,1,0,0,0,0,1,1,1,0) |
| 3 | (0,1,0,0,0,1,1,1,1,0,1,1,0,1,0,0,0,1,0,0,0,1,1,1,1,0) |
| 4 | (0,0,0,1,1,0,1,0,1,1,1,0,0,1,0,0,0,0,0,1,1,0,1,0,1,1) |
| 5 | (0,1,0,0,1,1,1,0,1,0,1,1,0,0,0,0,0,1,0,0,1,1,1,0,1,0) |
| 6 | (1,0,1,0,0,1,1,1,1,1,0,1,1,0,0,0,1,0,1,0,0,1,1,1,1,1) |
| 7 | (1,1,1,0,1,1,1,1,0,0,0,1,0,0,1,0,1,1,1,0,1,1,1,1,0,0) |

FIG. 8

PERFORMING, BY THE UE, CELL RECONFIRMATION USING INFORMATION DERIVED FROM A NORMAL BURST (NB) OF A TRANSMITTED GLOBAL SYSTEM FOR MOBILE COMMUNICATION (GSM) RADIO SIGNAL, WHEREIN SAID CELL RECONFIRMATION VERIFIES AN IDENTIFY OF A GSM CELL ASSOCIATED WITH THE TRANSMITTED GSM RADIO SIGNAL — 84

FIG. 11

METHODS AND SYSTEMS FOR A GENERIC MULTI-RADIO ACCESS TECHNOLOGY

TECHNICAL FIELD

The present invention relates generally to communication devices and, more specifically, to devices associated with multiple radio access technologies.

BACKGROUND

At its inception radio telephony was designed, and used for, voice communications. As the consumer electronics industry continued to mature, and the capabilities of processors increased, more devices became available for use that allowed the wireless transfer of data between devices. Also more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found an increasing need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems were implemented in GSM with the addition of the General Packet Radio Services (GPRS). 3G systems introduced by Universal Terrestrial Radio Access (UTRA) standards made applications like surfing the web more easily accessible to millions of users (and with more tolerable delay). Thus, numerous radio access technologies (RATs), such as e.g. Wideband Code Division Multiple Access (WCDMA), Orthogonal Frequency Division Multiple Access (OFDMA), Time Division Multiple Access (TDMA), Time Division-Synchronous Code Division Multiple Access (TD-SCDMA), and others, can be found in use today in wireless systems such as e.g. GSM, Universal Mobile Telecommunication System (UMTS), UMTS-LTE, Wireless Local Area Network (WLAN), Wi-Fi, etc.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radio communications in the years to come. This evolution of network designs has resulted in various network operators deploying their networks in various frequency bands with different RATs in various geographical areas. As a result of this, a user equipment (UE) which supports several frequency bands and/or several different RATs will need to be able to, among other things, search for cells and service in a correct frequency band and/or RAT.

The rapid development of new standards for mobile telephony and other communication technologies and the even more rapid addition of new features to the existing standards drive higher design costs for devices which use the currently existing architectures. For example, devices which enable access to a particular RAT or RATs typically have a software (SW) architecture that is tailored to that RAT(s) and its current features. When a new RAT or feature is added to a multi-RAT UE device architecture, not only the new RAT/feature has to be implemented in the architecture but also the legacy implementations have to be adapted, which process typically seriously affects the software implementation and adds significantly to the devices' costs.

This methodology for introducing a new RAT, or a new functionality to an existing RAT, makes the SW architecture of UEs complex and it becomes difficult to make the modifications that are necessary to adapt to such changes. Additionally, development is often performed at different geographical sites, sometimes located in different continents, causing the integration to be even more complicated and costly.

As described above, today's UEs can be capable of communicating with multiple wireless networks. In order to support mobility among other different networks, the UEs should be able to perform cell-reselection/handover related measurements on neighbor cells. A UE typically communicates with a serving cell in only one wireless network at a given moment (which is known as the active RAT) but in the background, the UE can periodically make measurements for cells in other wireless networks. The cell measurements may include, for example, measurements for received signal strength, timing, frequency and cell identification.

If the active RAT is a UMTS Frequency Division Duplexing (FDD) system, the UE uses continuous transmission and reception operation in the dedicated mode, and therefore measurement gaps need to be created artificially. On command from the UTRAN, the UE monitors cells on other FDD frequencies and on other modes and RATs that are supported by the UE, e.g., LTE, TDD, and GSM. The compressed mode is used in the CELL_DCH state only. To allow the UE to perform measurements, the UTRAN commands the UE to enter a compressed mode, depending on the UE capabilities. In the UE idle mode, URA_PCH and CELL_PCH states, the compressed mode is not needed for inter-frequency and inter-RAT (I-RAT) measurement because there is no continuous reception of any channel. The paging channel (PICH/PCH) is based on discontinuous reception (DRX) and the broadcast channel (BCH) of the serving cell is only required when system information changes.

In the CELL_FACH state, there are forward access channel (FACH) measurement occasions that are used to generate the equivalent connection management (CM) gap and can reasonably be used for inter-frequency and I-RAT measurements. It is to be understood that these FACH measurement occasions are increments of frames rather than timeslots. The UE attempts to detect, synchronize and monitor intra-frequency, inter-frequency and I-RAT cells indicated in the measurement control system information of the serving cell. UE measurement activity is also controlled by measurement rules defined in $3^{rd}$ Generation Partnership Project (3GPP) Technical Specification (TS) 25.304.

If the active RAT is an LTE FDD system, the compressed mode is no longer applicable so a scheduled gap measurement is proposed. An Evolved-Universal Terrestrial Radio Access Network (E-UTRAN) needs to provide a period in which no downlink data will be scheduled for the UE. In the active state, the eNB (e-nodeB) provides measurement gaps in the scheduling of the UE, where no downlink or uplink scheduling occurs. Ultimately the network makes the decision, but the gap provides the UE sufficient time to change frequency, make a measurement change and switch back to the active channel. This can normally occur in a few Transmission Time Intervals (TTIs). This has to be coordinated with the DRX, which also causes the system to shut off the radio for periods of time to save power. Also, in connected mode LTE, the gaps are not uniformly distributed and there is a DRX.

In the UE, if one of the supported RATs is GSM and an active RAT is LTE or UMTS, then the UE measures the signal level of the GSM Broadcast Control Channel (BCCH) carrier of each GSM neighbor cell indicated in the measurement control system information of the serving cell at least every $T_{measure}$ GSM, according to the measurement rules defined in 3GPP TS 36.133 (for LTE) and 3GPP TS 25.133 (for UMTS). According to these measurement rules, the UE shall attempt to verify the Base Station Identity Code (BSIC), which is a six bit code and each BTS in GSM has a BSIC which identifies it, at least every $T_{reconfirm.gsm}$ (in LTE) or $N_{re-confirm\_abort}$ (in GSM) for each of the four strongest GSM BCCH carriers. The UE then ranks the verified GSM BCCH cells according to the cell reselection criteria. If a change of BSIC is detected for one GSM cell then that GSM BCCH carrier shall be treated as a new GSM neighbor cell. If the UE detects a BSIC, which is not indicated in the measurement control system information, the UE shall not consider that GSM BCCH carrier in cell reselection. The UE also shall not consider the GSM BCCH carrier in cell reselection, if the UE cannot demodulate the BSIC of that GSM BCCH carrier.

If the active RAT is GSM, after the UE selects a particular cell/BCCH carrier to listen to when the UE is in idle mode, the UE shall continue to monitor all BCCH carriers as indicated in the base station allocation (BA) list (see, e.g., 3GPP TS 45.008 section 6.6.1). The UE shall monitor first the RSSI of the non-serving carriers, up to 32 carriers. Then, if a new carrier is found, whose signal strength is greater than the defined threshold, the UE will schedule Frequency Correction Channel (FCCH) detection on that carrier. If FCCH is detected, SCH detection will then be scheduled by the UE for that carrier after getting the rough timing information about in which TDMA frame, the SCH on that carrier will be appearing. If the SCH is decoded properly, then the SCH decoded data will convey the Reduced Frame Number (RFN) which is 19 bits and the BSIC which includes a three bit base station identity code BCC and a three bit network identity code (NCC). The UE then checks the validity of the BSIC and if the BSIC is new, e.g., the cell is new and allowed, the cell is added in the cell list if it was not added earlier. Once a new cell is found and added in the cell list, the UE tries to monitor that cell on a regular basis to re-confirm that it is actually monitoring the same cell. This process is known as BSIC reconfirmation. Also when in the dedicated mode, the UE performs this BSIC reconfirmation.

According to 3GPPP TS 45.008, the UE shall attempt to check the BSIC for each of the six strongest non-serving cell BCCH carriers at least every 30 seconds to confirm that the UE is monitoring the same cell and that it is essential for the UE to identify which surrounding Base Station Subsystem (BSS) is being measured in order to ensure reliable handover. Thus, it is necessary for the UE to synchronize to and demodulate surrounding BCCH carriers as well as identify the BSIC. The UE shall attempt to demodulate the SCH on the BCCH carrier of as many surrounding cells as possible and to decode the BSIC as often as possible, at least once every 30 seconds. A list containing BSIC and timing information for these strongest carriers at the accuracy required for access to a cell (see 3GPP TS 45.010) including the absolute times derived from the parameters T1, T2 and T3 shall be kept by the UE. This information may be used to schedule the decoding of the BSIC and is used when re-selecting a new cell in order to keep the switching time at a minimum.

It is desirable that the cell measurements and cell reconfirmation should be completed as soon as possible for various reasons, such as, faster monitoring, more quickly going into a sleep mode for power saving, etc. As described above, the BSIC identification should happen very frequently in a UE and occurs in the idle mode as well as in the dedicated mode or packet transfer mode.

When the UE is operating in LTE, WCDMA or GSM as the active RAT and the UE is in the idle mode condition, as shown in FIG. 1, the UE periodically wakes up according to the DRX period of that mode to perform paging reception, measurements and cell re-confirmations related to activities in the Active Period 2. As the UE frequency needs to be stable, before the paging reception and other activities, the UE ideally wakes up a bit early, e.g., approximately five ms before the Active Period 2 to get ready for AFC, HW configuration, stabilization etc., which is known as the Pre-wake Up period 4.

For the interested reader, the requirements for GSM measurements are listed in 3GPP TS 45.008 (GSM), 3GPP TS 25.133 (WCDMA) and 3GPP TS 36.133. GSM measurements can be divided into three different types: (1) GSM carrier RSSI measurement, (2) GSM carrier BSIC search, i.e., the initial BSIC identification, and (3) periodic BSIC reconfirmation in which after the initial synchronization has been found, this process is periodically confirming that by checking the cell identity repeatedly.

Returning to the present scenario, the RSSI measurement can be performed with the idle mode Active Period 2 so that the UE can complete the BCCH carriers signal strength measurement in this wake up period. Also, it is desirable to complete the other periodic task of BSIC reconfirmation in the same Active Period 2. This allows for the UE to complete all of the activities during the same wakeup period and thus to quickly go to sleep again and need not have to wake up again after some time to receive the SCH burst for cell re-confirmation. However, the main bottleneck for this procedure is to complete the cell reconfirmation as the UE has to read the SCH burst data of every neighbor cell according to the BA list or cell list for cell reconfirmation.

Now, as shown in FIG. 2, the SCH uses a Synchronization Burst (SB) and appears in the 51 multi-frame structure 6 of that neighbor cell's BCCH frequency. In FIG. 2, for the GSM network 51 multi-frame structure, F is the FCCH, S is the SCH, B is the BCCH, P s the PCCH or CCCH channel and I is for an idle frame. These channels appear in a time multiplexed manner in the same frequency and time slot in a repeating sequence as shown.

According to the presently existing implementation for GSM neighbor cell reconfirmation purpose, the UE has to receive the neighbor cell's SCH, which contain the SB burst, and then demodulate and decode it to get the BSIC. The UE checks the validity of the BSIC and, if the BSIC is new, e.g., the cell is new, and if that cell is allowed then the cell is added to the cell list unless it was already on the cell list. Otherwise, if the BSIC matches the BSIC previously stored for that cell then the UE reconfirms the synchronization with that neighbor cell's Base Station.

However, GSM and WCDMA are asynchronous systems. The cells in each network operate asynchronously of one another. This asynchronous operation at the cell (GSM cells) and network (RAT) level complicates the cell measurement and confirmation. Because these serving and neighbor cells are not perfectly time aligned, each neighbor cell's 51 multi-frame structure is not time aligned. Therefore, the UE needs to keep track of the time offsets. Typically, the UE maintains a cell timing offset database for monitoring of all the neighbor cells.

However, as described above, there is no guarantee that all of the neighbor cells' SCH timeslots will fall within the Active Period 2, e.g., or guarantee that the paging activity period and that all neighbor cells' SCHs will coincide all of the time. This causes a major difficulty in the current, conventional I-RAT implementation.

A similar problem also exists in an active RAT's dedicated mode as well since the measurement time available is very short. For example, in WCDMA dedicated mode, creating suitable gap patterns using compressed mode is not easy and also involves sacrifice to throughput handling. In the LTE active RAT case, the gaps are not regular since LTE has DRX in the connected mode. So, making sure that all of the neighbor cells' SCHs will fall inside the provided measurement time gap period is very difficult to achieve and to confirm the cells BSICs is practically not possible to always achieve. For example, FIG. 3 shows a dedicated mode scenario including measurement time gap 8 which gap 8 does not coincide with either SCH timeslot(s) 7, 9 of its GSM neighbor cells #1 and #2.

Accordingly, it would be desirable to provide methods and systems which improves cell reconfirmation.

SUMMARY

The embodiments present solutions to, for example, problems associated with cell reconfirmation. The embodiments provide, for example, more efficient solutions for a user equipment (UE) to perform cell reconfirmation with GSM neighbor cell(s). Advantages of these embodiments include reduced processor requirements and reduced power consumption for the UE. It will be appreciated by those skilled in the art, however, that the invention is not limited to those embodiments which produce any or all of these advantages or benefits and that other advantages and benefits may be realized depending upon the particular implementation.

According to an embodiment, there is a method for performing a cell reconfirmation method by a multi-Radio Access Technology (RAT) capable User Equipment (UE), the method includes: performing, by the UE, cell reconfirmation using information derived from a Normal Burst (NB) of a transmitted Global System for Mobile communication (GSM) radio signal, wherein said cell reconfirmation verifies an identity of a GSM cell associated with the transmitted GSM radio signal.

According to an embodiment, the method can further include: operating the multi-RAT capable UE in a serving cell of a first RAT; and selecting the cell reconfirmation method to reconfirm a Global System for Mobile (GSM) communication neighbor cell of a second RAT based on at least one selection criteria, wherein a first cell reconfirmation method which can be selected uses a received Normal Burst (NB) to perform the cell reconfirmation and a second cell reconfirmation method which can be selected uses a received Synchronization Burst (SB) to perform the cell reconfirmation.

According to another embodiment, there is a multi-Radio Access Technology (RAT) capable User Equipment (UE) including: a transceiver configured to receive radio signals; and a processor configured to perform cell reconfirmation using information derived from a Normal Burst (NB) of a transmitted Global System for Mobile communication (GSM) radio signal, wherein said cell reconfirmation verifies an identity of a GSM cell associated with the transmitted GSM radio signal.

According to another embodiment, the UE can also include: the multi-RAT capable UE configured to operate in a serving cell of a first RAT; and the processor configured to select a cell reconfirmation method to reconfirm a Global System for Mobile (GSM) communication neighbor cell of a second RAT, wherein a first cell reconfirmation method which can be selected uses a received Normal Burst (NB) to perform cell reconfirmation and a second cell reconfirmation method which can be selected uses a received Synchronization Burst (SB) to perform cell reconfirmation.

BRIEF DESCRIPTION OF THE DRAWINGS

The accompanying drawings illustrate exemplary embodiments, wherein:

FIG. 8 shows a Training Sequence Code (TSC) and training sequence bits according to an exemplary embodiment;

FIG. 11 shows method flowchart according to an exemplary embodiment.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
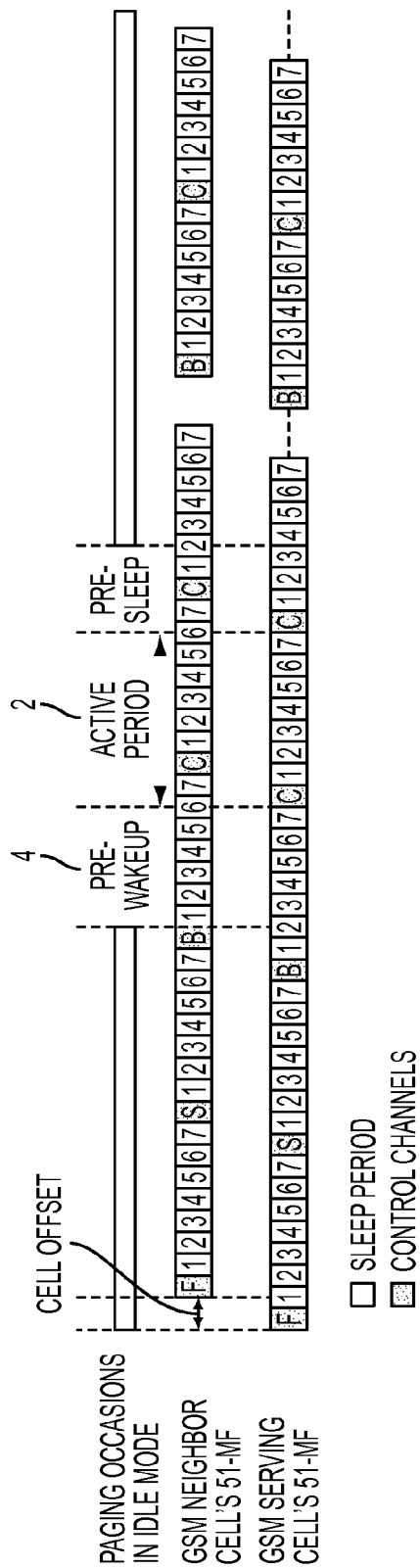
FIG. 1 illustrates idle mode activity for a User Equipment (UE)
Figure 2:
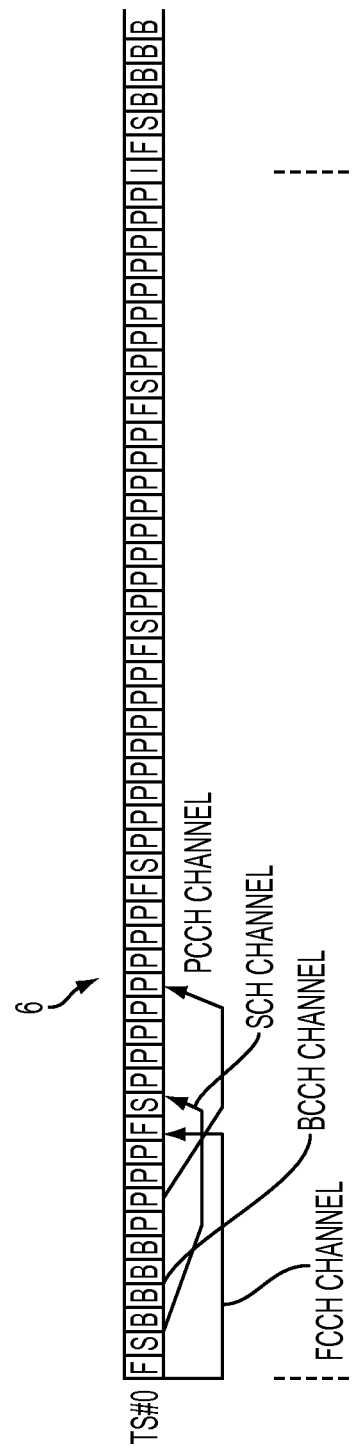
FIG. 2 depicts a Global System for Mobile (GSM) communications network 51 multi-frame structure.
Figure 3:
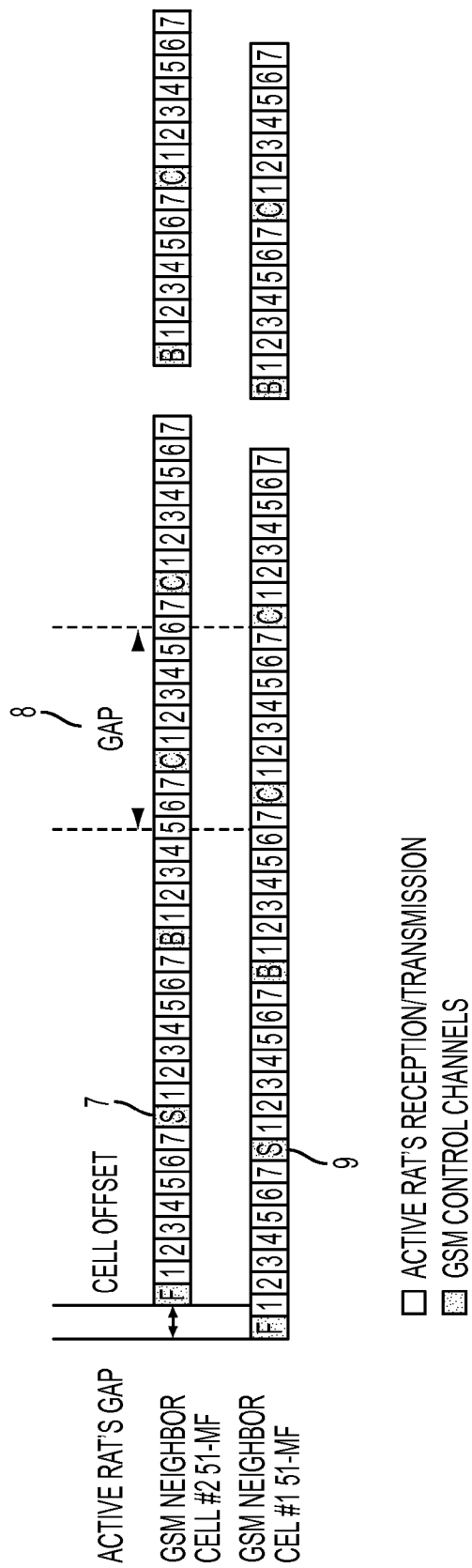
FIG. 3 shows a dedicated mode scenario.
Figure 4:
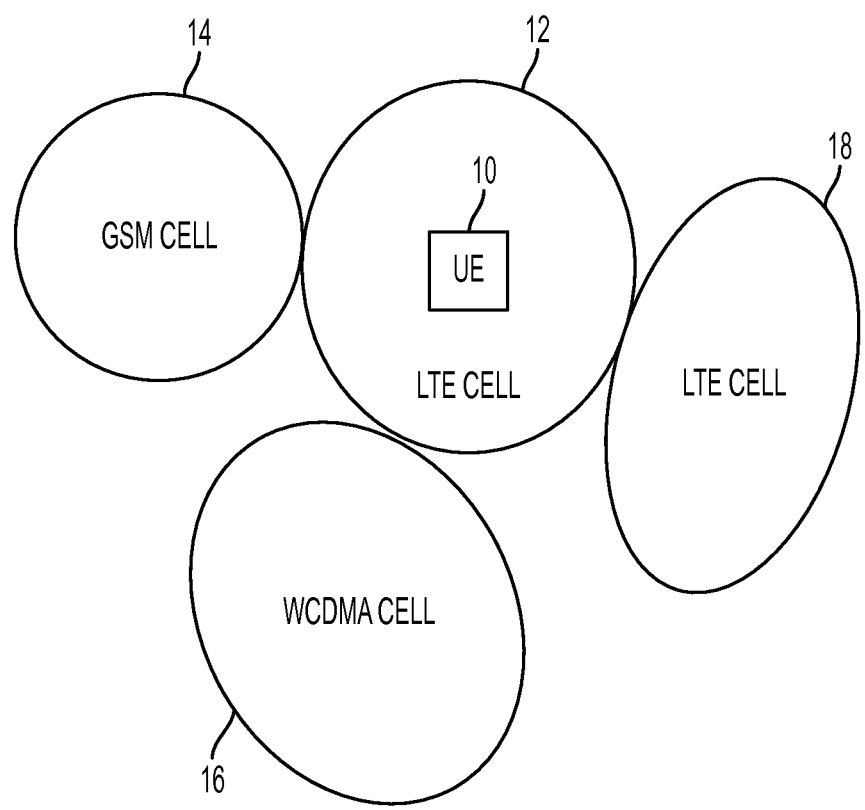
FIG. 4 depicts a UE in a multi-Radio Access Technology (RAT) environment according to an exemplary embodiment.

As described in the Background section, neighbor cell reconfirmation is a periodic process and if there are many GSM neighbors then reconfirmation of all of the cells in a multi-Radio Access Technology (RAT) user equipment (UE) becomes a challenging task due to limited time gap availability for measurement and monitoring in multi-RAT operating scenarios. Prior to describing the various embodiments, an environment in which these embodiments can operate is now described. FIG. 4 shows a multi-RAT capable UE 10 which is currently operating, e.g., in an active Long Term Evolution (LTE) RAT 12, but has neighbor cells of other RATs. For example the neighbor cells in this purely illustrative scenario include a Global System for Mobile (GSM) communications RAT 14, a Wideband Code Division Multiple Access (WCDMA) RAT 16 and another LTE RAT 18.

Periodic neighbor cell measurement and monitoring can be critical for a multi-RAT supported UE 10. For better inter-system and intra-system handover, the UE 10 has to monitor all of its neighbor cells periodically. However, in a multi-RAT UE 10 there could be many neighbor cells, and there is often very little gap time available or provided from the active RAT to do measurement and monitoring of other passive RATs' cells. When the UE 10 is in the idle mode and wakes up for paging reception, or the UE 10 is in the active mode time gap window, then during that time the UE 10 computes which of the neighbor cells' SCH slots falls under that activity period (in idle mode) or gap period (in dedicated mode). For those cells that fall under that activity period or gap period, the UE 10 schedules the normal procedure for SCH reception. Then from that reception, the UE will be able to reconfirm the cell by decoding the BSIC and comparing it with a previously stored BSIC as is done conventionally. But for the cells, whose SCH are not currently aligned with this given time window, using conventional methods, there is no reception scheduled for cell reconfirmation, i.e., no SCH could be found for those neighbor cells in that given time window.

For the UE 10 in idle mode, the UE 10 wants to stay in the sleep mode as long as is possible. However, in idle mode the UE 10 still needs to periodically do some activities like paging monitoring, received signal strength indicator (RSSI) measurement, cell monitoring, etc. If all of these activities are performed together then the UE 10 can do all of these tasks in a single wakeup and can then extend its sleep duration which allows for power saving.

According to exemplary embodiments, these problems can be addressed if the periodic neighbor cell reconfirmation task is performed faster by not waiting for the SB burst appearance but instead by doing the same via NB and grouping this reconfirmation activity together with the UE 10's activity or wake up period. More specifically, a dynamic decision making algorithm for using either SB or NB reception scheduling for cell reconfirmation and a cell reconfirmation algorithm using NB can be used.

Exemplary embodiments provide methods for performing neighbor cell reconfirmation using a Synchronization Burst (SB) as well as using a Normal Burst (NB), depending upon the one or more decision criteria. An algorithm can be used, which can be executed in a UE, to (1) decide whether the UE 10 should perform cell reconfirmation through SB reception and decoding or through NB reception and decoding to derive the Base Station Identity Code (BSIC) and (2) then comparing the BSIC for identification confirmation. This algorithm can access the present operating scenario of the UE 10 and take a decision about whether to do the cell reconfirmation using SB or NB reception based on, for example, one or more decision criteria such as (but not limited to) the confirmation delay, a missed opportunity with respect to the SB and the measurement time gap, power consumption, reliability metrics and/or other factors as desired.

According to an embodiment, if the UE 10 decides to reconfirm a cell's identity using the SB then the legacy procedure of: (1) tuning the radio frequency (RF) to that of the neighbor cell's broadcast frequency; (2) receiving the SB in the Synchronization Channel (SCH) channel; (3) demodulating; and (4) decoding to obtain the BSIC can be performed following conventional methods. However, if the UE 10 decides to reconfirm the cell using the NB, then the UE 10 receives the Training Sequence Code(s) (TSC) part of the NB of the Common Control Channel CCCH, the Broadcast Control Channel (BCCH) or any logical channel in the 51 multi-frame signaling channel structure which uses the NB. The UE 10 then uses a matching algorithm to find out which portion of the received NB bit stream is the TSC data bit pattern, i.e., has the TSC number (which one out of the 8 TSCs possible), present in the received NB. There is a direct mapping between the TSC number used in the NB and the Base Station color code (BCC), e.g., the Base Station ID. Therefore, by identifying the TSC number present in the NB, the UE 10 will identify the BCC number. That information can be used by the UE to reconfirm that the cell whose NB has been received is the cell that the UE 10 intends to monitor, i.e., if the derived BCC number and the expected BCC number match then the cell is reconfirmed. This technique can be useful for a faster UE 10 reconfirmation, especially in time critical situations and for extending the sleep duration of the UE 10. A more detailed description of the various embodiments is now presented below.

Dynamic Scheduling Algorithm for BSIC Reconfirmation

The BSIC (3 bit NCC and 3 bit BCC) needs to be decoded at least once for every thirty second interval. If there are many neighbor cells in the BCCH Allocation list (BA) cell list, then the UE 10 needs to read the BSICs from all of these neighbor cells. A portion of the exemplary embodiments described herein uses, as an option, the conventional method of BSIC reconfirmation using the SB burst.

Figure 5:
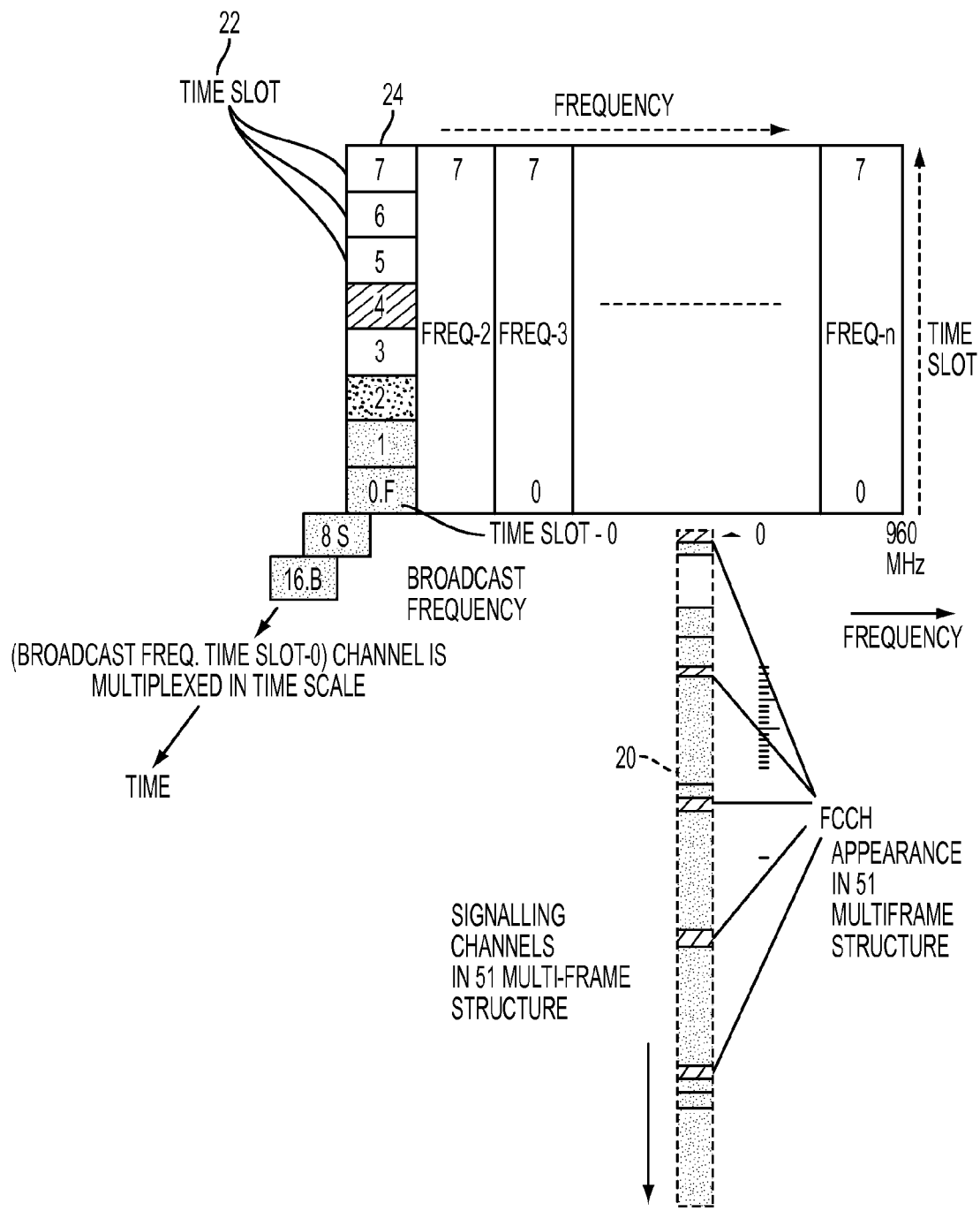
FIG. 5 shows a GSM 51 multi-frame structure with channels appearing in a time multiplexed manner according to an exemplary embodiment.

The BSIC reconfirmation method using the SB burst includes the following steps: (1) the UE 10 tunes the RF for receiving the broadcast frequency channel of an intended neighbor cell. (2) The UE 10 schedules the reception of SCH channel, which carries the SB, which appears in a time multiplexed manner along with the other channels (Frequency Correction Channel (FCCH), CCCH, BCCH, etc.) in the GSM 51 multi-frame signaling structure 20 as shown in FIG. 5. This includes a plurality of time slots 22 for each frequency, e.g., frequency 24. (3) The UE 10 receives the SB, demodulates and decodes the information which provides the BSIC number (3 bit NCC and 3 bit BCC). (4) The UE 10 checks whether the received information is the cell that the UE 10 wants to monitor or not, e.g., the UE confirms this by comparing the received BSIC number with the expected cell's BSIC number. If they match, then that neighbor cell is reconfirmed.

This method of cell reconfirmation has some advantages and disadvantages associated with it. Firstly, the SCH appears relatively rarely in the 51 multi-frame structure (i.e., once every $10^{th}$ Time Division Multiple Access (TDMA) frame) where each GSM TDMA frame is 4.615 ms. Thus the time gap between successive SCHs on a given frequency is ten frames in length, e.g., 46.15 ms, which makes reception of the SCH channel in a provided measurement time gap, especially in the multi-RAT scenario, very difficult. In other words, the UE 10 finds it difficult to align the neighbor cell's SCH reception for cell reconfirmation in the provided measurement time gap. As mentioned earlier, this can lead to the problem wherein all neighbor cells are not reconfirmed for a long time duration as the UE 10 does not get the opportunity to read the SCH especially when there are a large number of neighbor cells. Such a long time between reconfirmation might also not satisfy the 3GPP requirements.

Secondly, the UE 10 can find it difficult to align the SCH reception with its sleep/activity, e.g., wake up period. This leads to increased power usage by the UE 10 as the UE 10 is either awake longer while waiting for the SCH or the UE 10 has to wake up again just for SCH reception. An advantage of this method of cell reconfirmation through using the SB is that as the UE 10 receives the SB, decodes the six bit BSIC existing in the SB and confirms the BSIC via the above described comparison, the cell reconfirmation reliability is one hundred percent confirmed.

According to another embodiment, cell reconfirmation can alternatively be done using the NB. For this process, the UE 10 uses the NB in the CCCH, BCCH or any other channel's NB which appears in the 51 multi-frame signaling channel structure, which can be utilized as an alternative method along with (or alternatively to) the legacy method of BSIC reconfirmation by SCH decoding to confirm the BSIC. This exemplary process allows the UE 10 to receive the NB which has a unique TSC in the NB associated with that cell's ID. Knowing the used TSC number in the NB, the UE 10 can determine the three bit BCC number. This allows the UE 10 to quickly reconfirm the neighbor cell using this method which is described in more detail below.

Disadvantages of cell reconfirmation through using the NB include that this method only relies on the three bit BCC part of the BSIC and confirms that it matches. In some radiocommunication scenarios, the BCC part of the neighbor cells is different and comparing only the BCC part is good enough to reconfirm the neighbor cell. However, it is possible that in a particular area there may be two networks which share the same frequencies. In such a case the NCC, i.e., the upper three bits of the BSIC, is different, but the BCC, i.e., the lower three bits of the BSIC, are the same. This means that for this specific case the cell reconfirmation would generate an incorrect result and is therefore not always one hundred percent reliable.

Advantages of cell reconfirmation through using the NB include not needing to have the measurement gap time aligned with the SCH burst as the CCCH, BCCH, Stand-alone Dedicated Control Channel (SDCCH) and the Slow Associated Control Channel (SACCH) channels in the 51 multi-frame structure all use the NB which means that the appearance of the NB is relatively frequent. This allows for the cell reconfirmation to be done at most anytime with little or no time wasted waiting for the burst. This allows for a typically faster reconfirmation, a more numerous amount of periodic reconfirmations can be scheduled, as well as no or minimal skipping of cell reconfirmation due to a small measurement time gap. The cell reconfirmation can be aligned easily with the wake period so that the UE 10's sleep time can be extended which leads to power saving. Also, as the NB method of cell reconfirmation does not use demodulating and decoding of the received NB there is additional power saving to be obtained.

According to an exemplary embodiment, the UE 10 now can have two methods by which it can do the cell reconfirmation. A dynamic selection algorithm can be used to analyze the present UE 10's situation and based on one or more various parameters, such as the advantages and disadvantages of the methods and associated features described in more detail below, the dynamic selection algorithm can select one of the cell reconfirmation methods for use.

Dynamic Selection Algorithm

According to exemplary embodiments, the dynamic selection algorithm can select cell reconfirmation using SB decoding for one or more of the following scenarios: (1) if the UE 10 is identifying a specific neighbor cell for the first time; (2) if in the previous two iterations of cell reconfirmation the UE 10 has reconfirmed a specific neighbor cell using the NB; (3) if there are not more than a predetermined number of neighbor cells, e.g., between 1 and 32 GSM neighbor cells, in the cell monitoring list or reconfirmation list; (4) if the UE 10 knows that it is operating in a particular area which has two or more networks which share the same frequencies; (5) if the UE 10 has a monitoring gap or a measurement time gap which is longer than a predetermined amount of time; (6) if extending the sleep duration or power saving is not required by the UE 10; and (7) if a previous cell reconfirmation attempt using the NB has failed, e.g., the cell ID was not successfully matched. The previous list of potential SB decoding selection criteria will be understood to be exemplary and other criteria may be used.

According to exemplary embodiments, the dynamic selection algorithm can select cell reconfirmation using NB TSC detection or demodulation (alternatively, there are NB correlation methods which do not use demodulation which are described in more detail below) for one or more of the following scenarios: (1) if the UE 10 is not able to align the SB reception slot of the intended neighbor cell in the given measurement time window or gap but at least one channel with the NB is visible in the given measurement time window or gap; (2) if, in the previous cell reconfirmation, the UE 10 used the SB method; (3) if the UE 10 desires or needs to extend the sleep period or to reduce the wake up for power saving reasons and the SB of the neighbor cell is not aligned with the wake up period; (4) if the UE 10 has a monitoring gap or measurement time gap which is less than a predetermined amount of time, e.g., approximately 6 ms for LTE, 4.7 ms for WCDMA or 4.615 ms for GSM TDMA; (5) if the number of monitored neighbor cells is greater than a predetermined number; or (6) if the UE 10 has a time budget which is less than a predetermined amount of time. The foregoing list of NB decoding selection criteria is exemplary end other selection criteria can be used.

Figure 6:
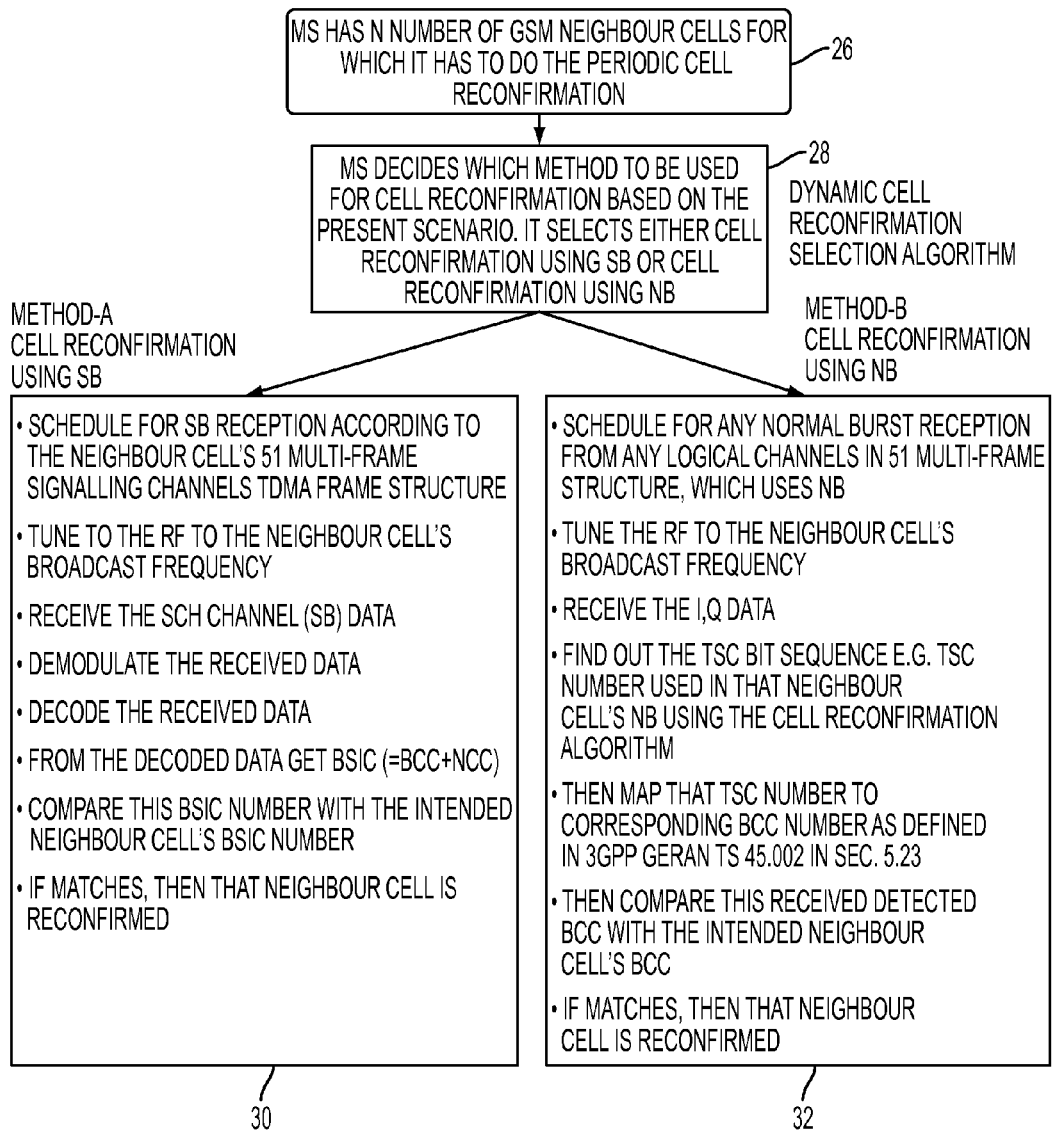
FIG. 6 illustrates a dynamic cell reconfiguration selection algorithm according to an exemplary embodiment.

Having described various scenarios for using either cell reconfirmation with the SB (also referred to herein as "method-A") or cell reconfirmation using the NB (also referred to herein as "method-B") a dynamic cell reconfirmation selection algorithm will now be described with respect to the flow diagram shown in FIG. 6. This exemplary embodiment is usable when, for example, a UE 10 has n number of GSM neighbor cells for which it has to perform the periodic cell reconfirmation as shown in step 26. The dynamic cell reconfirmation selection algorithm is performed in step 28 in which the UE 10 decides which method is to be used for cell reconfirmation based on the present scenario and selects either cell reconfirmation using SB or cell reconfirmation using NB. This decision of the present scenario can be based upon one or more of the criteria described above for when to use the SB method or the NB method.

Figure 7:
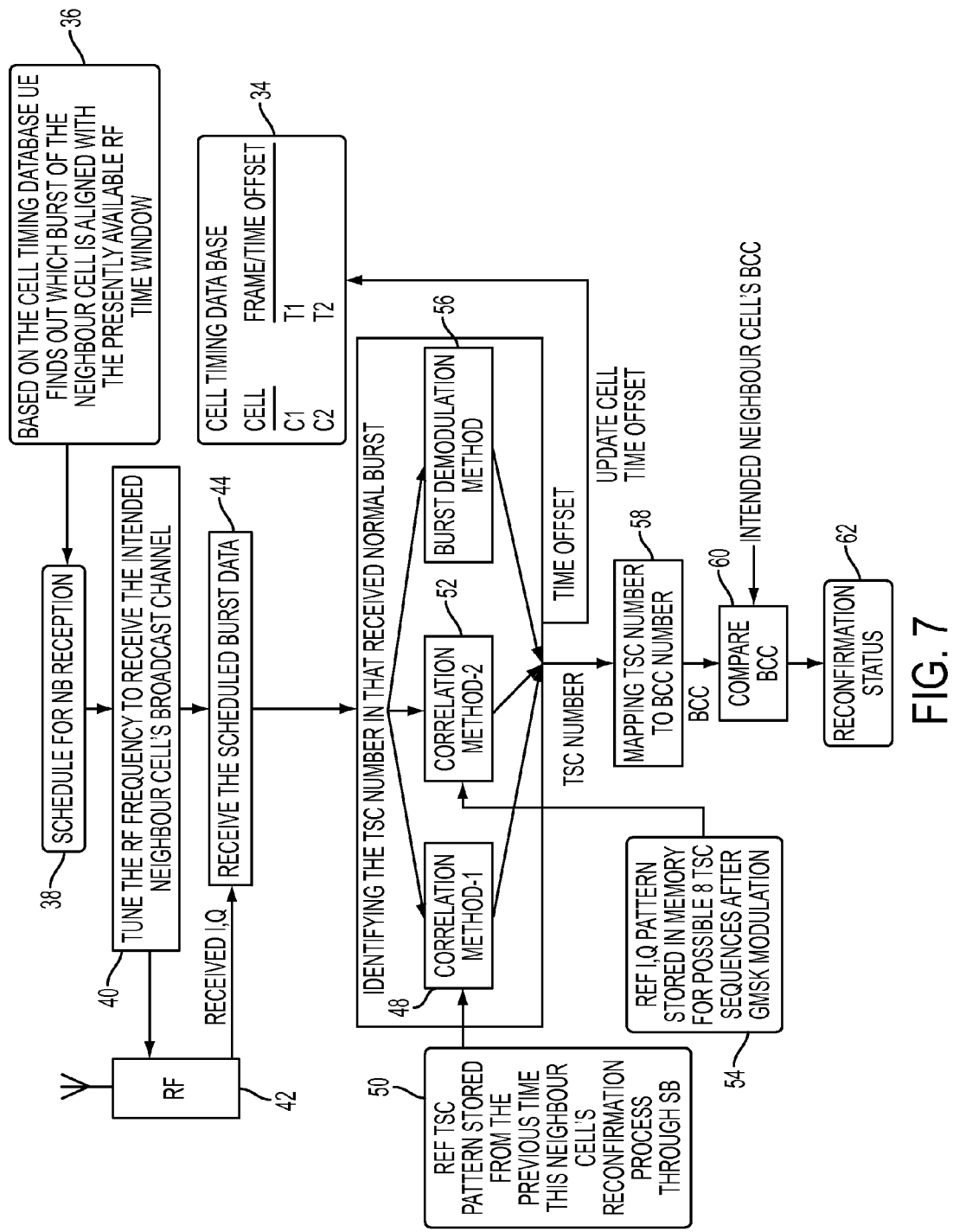
FIG. 7 illustrates an algorithm for cell reconfirmation using a Normal Burst (NB) according to an exemplary embodiment.

For the case of using the SB method, the UE 10 follows the steps as shown in step 30 which is the conventionally known SB decoding technique. Step 32 shows a method for performing cell reconfirmation using the NB method. A more detailed method for using the NB method according to an embodiment will now be described with respect to FIG. 7.

According to exemplary embodiments, the UE 10 can include a cell timing data base 34 which includes various cells and their frame and/or timing offset value. This time offset value is the offset between the 51 multi-frame structure of the serving cell and the identified neighbor cell. Based on the cell timing database 34, the UE 10 determines which burst of the neighbor cell of interest is aligned with the presently available RF time window as shown in step 36. The UE 10 then schedules for NB reception as shown in step 38. Regarding step 38, the UE 10 can schedule the reception of any GSM logical channel which appears in the 51 multi-frame structure and uses the NB for data transmission like CCH, BCCH, etc. The 51 multi-frame structure is already known to the UE 10 and the UE 10 also knows in which slot which channel will be located since the UE 10 maintains the cell timing database 34. Once a cell has been identified, e.g., through SCH decoding for the first time during cell identification, thereafter the UE 10 knows which logical channel's burst to expect in the open RF time window or given time gap. This means that the UE 10 roughly knows whether the received burst will be an SB, FB, or NB (from CCCH or BCCH) which the UE 10 is going to receive for that neighbor cell during a given scheduled reception.

Next, in step 40, the UE 10 will tune the RF to receive the intended neighbor cell's broadcast channel which, for the 51 multi-frame structure, appears only in the cell's broadcast frequency in slot number 0. As previously shown in FIG. 5, the broadcast channel is time multiplexed among several logical channels. The RF controller and antenna(s) of the UE 10 are shown in block 42 of FIG. 7.

The UE receives the scheduled burst data (I, Q data) in step 44. Here the UE 10 can program the RF controller 42 to receive the complete NB or the UE 10 can program the RF controller 42 for a shorter reception window to only receive the TSC part in the NB. In the latter case, the UE 10 can program the RF controller 42 such that the UE 10 receives the TSC part of the NB (with some allowance on both sides of the TSC position) of that neighbor cell by tuning to that neighbor cell's frequency. Received I, Q data can, for example, be of approximately 50 bits in length which leads to a time duration of approximately 184.5 µs. This allows the UE 10 to avoid processing the entire NB which in turn leads to faster reception, a quicker confirmation process and a power saving as the RF window is opened for a shorter interval.

Figure 9:
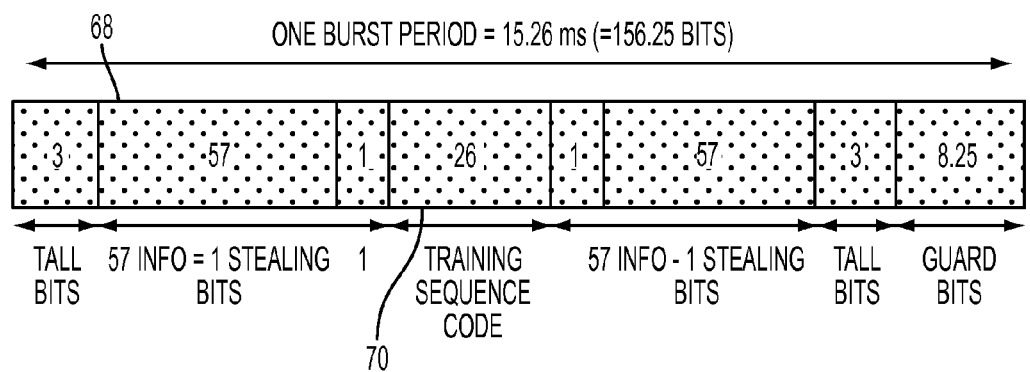
FIG. 9 illustrates an NB structure with the TSC in the middle of the burst according to an exemplary embodiment.

In step 46, the UE 10 identifies the TSC sequence number in the received NB. The NB carries the 26 bit TSC and, by knowing the sequence, the UE can identify the TSC number. The TSC bit pattern is defined in Table 5.2.3a TSC Set 1 in 3GPP TS 45.002 which is replicated in FIG. 8. FIG. 8 shows the TSC 64 and the associated TSC bits 66. FIG. 9 shows the NB structure 68 with the TSC 70 in the middle of the burst. According to exemplary embodiments, there are a few different methods for detecting the TSC number in the received NB as described below.

According to an exemplary embodiment, a correlation method can be used for detecting the TSC number in the received NB. The first time that the UE 10 identifies a new cell and adds that cell into the cell timing data base 34, the UE 10 also stores the cell timing offset of that neighbor cell as well as storing the I, Q samples around the detected TSC start position. This information can be used as reference or template data for matching during the reconfirmation process. During cell reconfirmation, when the UE 10 wants to reconfirm a cell through the NB method, then the UE 10 has received the 50 bits, e.g., 50 I, Q samples, around the TSC position or the entire NB's I, Q data. The UE 10 then compares this received data with the reference stored template data in the cell timing data base 34 as shown in block 50. If there is a match, e.g., the correlation peak value exceeds a defined threshold, then it signifies that the stored TSC pattern and the received TSC pattern are the same. Now the stored TSC number is known and therefore the received TSC number will also be known. The advantage of using this first correlation method 48 is that it is quick to perform and takes very little processing power and time as compared to other methods. A drawback to this first correlation method 48 is that it requires pre-stored TSC data of the intended cell for which reconfirmation is desired.

According to another exemplary embodiment, there is a second correlation method 52. This second correlation method 52, which still uses the NB to perform cell reconfirmation, starts with the knowledge that all 8 possible TSC bit sequences are known a priori. Therefore, these TSC bit sequences can be Gaussian Minimum Shift Keying (GMSK) demodulated and pre-stored in the memory of the UE 10. These 8 pre-stored patterns can then be used as a reference to match with the received I, Q data. Correlation of the received I, Q samples can be done with the stored GMSK demodulated 8 TSC bit sequences specific I, Q samples one after the other as shown in block 54. Whichever match provides the highest peak is chosen as the received TSC value in the NB. As compared to the first correlation method 48, this second correlation method 52 requires a bit more processing power but can advantageously be used for cell identification and reconfirmation cases.

According to another embodiment, NB demodulation can also be performed as shown in step 56. For this method, the TSC portion of the received burst is copied to one side of the received burst data, e.g., the received NB data content in the left side of the TSC location is replaced by the I, Q samples located in the TSC location. The reformatted burst data is channel estimated using the known TSC number (as the TSC number of the intended neighbor cell is already known) and then equalized and demodulated. This will provide the soft values of the TSC data. The method then compares those soft values, i.e., the sign part only, with the intended TSC bits and then counts the matching instances. If the counted value exceeds a certain threshold, e.g., 20 where the maximum will be 26, this indicates which TSC was present in the received burst data and that it was the expected TSC value. As the TSC was known, the matching TSC number is also known.

Regarding the neighbor cell time offset, during these NB methods, whether correlation is used or demodulation is used, the exact location of the TSC in the received burst will be detected through peak or time offset through demodulation. This will provide the time offset value between this neighbor cell and the serving cell. This time offset can be stored in the cell timing database 34.

According to exemplary embodiments, after performing the task of identifying the TSC number in the received NB in step 46, mapping the TSC number to the BCC number occurs in step 58. For this step, the TSC used in the NB and the BTS number (base station color code (BCC)) are linked as can be found in 3GPP GERAN TS 45.002 in section 5.2.3, which indicates that each adjacent cell (BTS) should use a different TSC in the NB. So, by knowing which TSC number is present in the received NB, the UE can derive the BCC number. 8 TSC numbers and 8 BCC numbers are directly mapped to each other.

In step 60, the UE 10 compares the received BCC number with the expected neighbor cell's BCC number. If these two match, the UE 10 then declares the cell reconfirmation a success and if they do not match then the UE 10 declares the cell reconfirmation a failure as shown in step 62.

According to an embodiment, the UE 10 can group the RSSI measurement operation for a cell with the same cell's reconfirmation process in order to allow the UE 10 to save processing cycles and operation time. This allows the UE 10 to measure RSSI from the received NB for cell reselection so that there is no need for the UE 10 to do a separate RSSI measurement again for this cell.

The exemplary embodiments described herein allow for improving the UE 10 in various manners. These improvements include, but are not limited to, the following: (1) improved handover decisions as cell monitoring can more quickly be performed; (2) simpler I-RAT monitoring design and modification as the idle paging monitoring and other cell measurement and reconfirmation related activities can now be performed together which makes the UE I-RAT design simpler including an easier overall implementation; (3) many cells can be monitored without any issue of time synchronization and SCH alignment issues with the neighboring and serving cell; (4) a reduced number of wakeups for the UE 10; (5) an increased sleep duration for the UE 10; (6) a reduction in the frequency of performing pre-wakeup activities; and/or (7) a reduction of processing power needed, monitoring complexity and power consumption by the UE 10.

Figure 10:
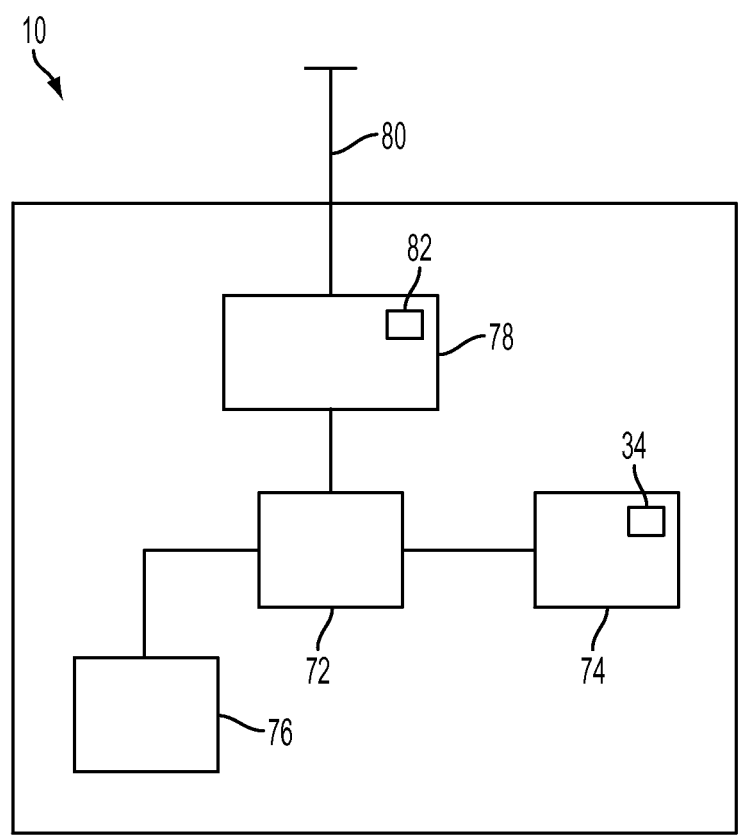
FIG. 10 depicts a UE according to an exemplary embodiment.

The exemplary embodiments described above provide, among other things, for a multi-RAT capable UE 10 which can execute a dynamic selection algorithm as described above. An exemplary (and highly generalized) UE 10 will now be described with respect to FIG. 10 including hardware which can use the dynamic selection algorithm. Therein, the UE 10 can contain a processor 72 (or multiple processor cores), memory 74, one or more secondary storage devices 76, an interface unit 78 to facilitate communications between the device 10 and various RATs and cells and one or more antennas. The dynamic selection algorithm, as well as the various cell reconfirmation methods, can be stored in the memory 74 and be executed by the processor 72. The interface unit can include or perform the functions of an RF controller 82. The cell timing data base 34 can be stored in the memory 74 (or alternatively in the secondary storage devices 76).

An exemplary method for performing a cell reconfirmation method by a multi-RAT capable UE is illustrated in FIG. 11. Therein, at step 84, performing, by the UE, cell reconfirmation using information derived from a Normal Burst (NB) of a transmitted Global System for Mobile communication (GSM) radio signal, wherein said cell reconfirmation verifies an identity of a GSM cell associated with the transmitted GSM radio signal.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for performing cell reconfirmation by a multi-Radio Access Technology (RAT) capable User Equipment (UE), the method comprising:
performing, by the UE, cell reconfirmation using information derived from a Normal Burst (NB) of a transmitted Global System for Mobile communication (GSM) radio signal, wherein said cell reconfirmation verifies an identity of a GSM cell associated with the transmitted GSM radio signal,
operating the multi-RAT capable UE in a serving cell of a first RAT; and
selecting a cell reconfirmation method to reconfirm a GSM neighbor cell of a second RAT based on at least one selection criteria,
wherein a first cell reconfirmation method which can be selected uses the received NB to perform the cell reconfirmation and a second cell reconfirmation method which can be selected uses a received Synchronization Burst (SB) to perform the cell reconfirmation.

2. The method of claim 1, further comprising:
identifying a Training Sequence Number (TSC) received in the received NB by performing one of a first correlation method, a second correlation method or an NB demodulation method.

3. The method of claim 2, further comprising:
performing the first correlation method which includes the steps of:
adding GSM neighbor cell information into a cell timing data base prior to performing the first correlation method;
storing a cell timing offset of the GSM neighbor cell prior to performing the first correlation method; and
storing the I, Q samples around the detected TSC start position prior to performing the first correlation method.

4. The method of claim 3, wherein performing the first correlation method further comprises:
receiving the NB;
obtaining I, Q samples around a TSC position in the NB or using the I, Q samples from the entire NB;
comparing the obtained I, Q samples to previously stored I, Q samples associated with the GSM neighbor cell; and
determining if there is a match between the obtained I, Q samples and the previously stored I, Q samples match.

5. The method of claim 2, further comprising:
performing the second correlation method which includes the steps of:
demodulating all eight possible TSC bit sequences prior to receiving the NB;
storing all eight demodulated possible TSC bit sequences prior to receiving the NB;
receiving the NB;
obtaining I, Q samples around a TSC position in the NB or using the I, Q samples from the entire NB;
comparing the obtained I, Q samples to previously stored I, Q samples associated with each of the stored eight demodulated possible TSC bit sequences; and
determining which of the I, Q samples associated with the stored eight demodulated possible TSC bit sequences matches the obtained I, Q samples.

6. The method of claim 2, further comprising:
performing the NB demodulation method which includes the steps of:
copying a TSC portion of the received NB over a front portion of the received NB resulting in a reformatted burst data;
performing a channel estimation using a known TSC number of the reformatted burst data;
equalizing and demodulating the channel estimation to obtain soft values of TSC data of the received NB; and
comparing the soft values to TSC bits of the known TSC number.

7. The method of claim 1, wherein the first RAT is one of a Long Term Evolution (LTE) RAT or a Wideband Code Division Multiple Access (WCDMA) RAT.

8. The method of claim 1, wherein selecting the cell reconfirmation method further comprises:
using the received NB to perform cell reconfiguration if a time slot of a SB reception slot of the GSM neighbor cell located in the second RAT is not in a given measurement time window or if a received SB was used as the previous cell reconfirmation.

9. The method of claim 1, wherein selecting the cell reconfirmation method further comprises:
using the received SB to perform cell reconfiguration if the UE is identifying the GSM neighbor cell located in the second RAT for a first time.

10. The method of claim 1, wherein a Received Signal Strength Indicator (RSSI) measurement operation is performed in conjunction with performing the cell reconfirmation.

11. The method of claim 1, further comprising:
   storing the GSM neighbor cell information; and
   storing a timing offset associated with the GSM neighbor cell.

12. A multi-Radio Access Technology (RAT) capable User Equipment (UE) comprising:
   a transceiver configured to receive radio signals;
   a processor configured to perform cell reconfirmation using information derived from a Normal Burst (NB) of a transmitted Global System for Mobile communication (GSM) radio signal, wherein said cell reconfirmation verifies an identity of a GSM cell associated with the transmitted GSM radio signal;
   the multi-RAT capable UE configured to operate in a serving cell of a first RAT; and
   a processor configured to select a cell reconfirmation method to reconfirm a Global System for Mobile (GSM) communication neighbor cell located in a second RAT, wherein a first cell reconfirmation method uses a received Normal Burst (NB) to perform the cell reconfirmation and a second cell reconfirmation method uses a received Synchronization Burst (SB) to perform the cell reconfirmation.

13. The multi-RAT capable UE of claim 12, further comprising:
   the processor configured to identify a Training Sequence Number (TSC) received in the received NB by performing one of a first correlation method, a second correlation method or an NB demodulation method.

14. The multi-RAT capable UE of claim 13, further comprising:
   the processor configured to perform the first correlation method which includes the steps of:
   adding GSM neighbor cell information into a cell timing data base prior to performing the first correlation method;
   storing a cell timing offset of the GSM neighbor cell prior to performing the first correlation method; and
   storing the I, Q samples around the detected TSC start position prior to performing the first correlation method.

15. The multi-RAT capable UE of claim 14, wherein performing the first correlation method further includes the steps of:
   receiving the NB;
   obtaining I, Q samples around a TSC position in the NB or using the I, Q samples from the entire NB;
   comparing the obtained I, Q samples to previously stored I, Q samples associated with the GSM neighbor cell; and
   determining if there is a match between the obtained I, Q samples and the previously stored I, Q samples match.

16. The multi-RAT capable UE of claim 13, further comprising:
   the processor configured to perform the second correlation method which includes the steps of:
   demodulating all eight possible TSC bit sequences prior to receiving the NB;
   storing all eight demodulated possible TSC bit sequences prior to receiving the NB;
   receiving the NB;
   obtaining I, Q samples around a TSC position in the NB or using the I, Q samples from the entire NB;
   comparing the obtained I, Q samples to previously stored I, Q samples associated with each of the stored eight demodulated possible TSC bit sequences; and
   determining which of the I, Q samples associated with the stored eight demodulated possible TSC bit sequences matches the obtained I, Q samples.

17. The method of claim 13, further comprising:
   the processor configured to perform the NB demodulation method which includes the steps of:
   copying a TSC portion of the received NB over a front portion of the received NB resulting in a reformatted burst data;
   performing a channel estimation using a known TSC number of the reformatted burst data;
   equalizing and demodulating the channel estimation to obtain soft values of TSC data of the received NB; and
   comparing the soft values to TSC bits of the known TSC number.

18. The multi-RAT capable UE of claim 12, wherein the first RAT is one of a Long Term Evolution (LTE) RAT or a Wideband Code Division Multiple Access (WCDMA) RAT.

19. The multi-RAT capable UE of claim 12, wherein selecting the cell reconfirmation method will select using the received NB to perform cell reconfiguration if a time slot of a SB reception slot of the GSM neighbor cell located in the second RAT is not in a given measurement time window or if a received SB was used as the previous cell reconfirmation.

20. The multi-RAT capable UE of claim 12, wherein selecting the cell reconfirmation method will select using the received SB to perform cell reconfiguration if the UE is identifying the GSM neighbor cell located in the second RAT for a first time.

21. The multi-RAT capable UE of claim 12, further comprising:
   the UE configured to perform a Received Signal Strength Indicator (RSSI) measurement operation in conjunction with performing the cell reconfirmation method.

22. The multi-RAT capable UE of claim 12, further comprising:
   a memory configured to store the GSM neighbor cell information; and
   the memory configured to store a timing offset associated with the GSM neighbor cell.

* * * * *